United States Patent Office 3,228,975
Patented Jan. 11, 1966

3,228,975
AKYL-SUBSTITUTED CYCLOHEXYL GUANI-
DINES AND BIGUANIDES
Ernestine Gelblum Abraham, Cumberland, Md., and
Glentworth Lamb, Trenton, N.J., assignors to American Cyanamid Company, Stamford, Conn., a corporation of Maine
No Drawing. Filed Apr. 10, 1964, Ser. No. 358,938
6 Claims. (Cl. 260—501)

The present application is a continuation-in-part of U.S. application Serial No. 164,614, filed January 5, 1962, and now abandoned.

This invention relates to substituted cycloaliphatic amines and methods for preparing same. More particularly, the instant discovery concerns derivatives of cyclohexylamines and derivatives of alkyl-substituted cyclohexylamines.

The compounds of the present invention may be represented by the formula

wherein $R^3$ may be hydrogen, alkyl, branched and straight chain, having from 3 to 16 carbon atoms; $R'$ is selected from H and ethyl; and $R^2$ may be

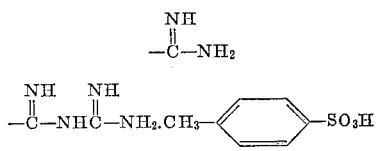

and the salts of the above guanidines with organic and inorganic acids. When $R^2$ in the above formula is guanidine, $R^3$ is alkyl ($C_3$ to $C_{16}$).

The products of the present invention are prepared, as will be seen in greater detail hereinafter, by reacting a compound of the formula

its organic or inorganic salt, with cyanamide or dicyandiamide and recovering the corresponding derivative. $R^1$ and $R^3$ have the meaning given above and these reactants are prepared as taught in copending U.S. application Serial No. 164,613.

The guanidine derivatives of the cyclohexylamine reactants contemplated herein are prepared by reacting cyanamide with the corresponding cyclohexylamine salt in the presence of an alcohol, such as alkanol, having from 3 to 8 carbon atoms. The reactants may be present in stoichiometric amounts or a slight excess of cyanamide relative to the cyclohexylamine salt reactant can be employed suitably. Temperatures in the range of 100° C. to 200° C. are desired. Generally, however, reaction is carried out at reflux temperature.

While atmospheric pressure is usually employed, subatmospheric and super-atmospheric pressures are contemplated herein. Likewise, any sequence of addition of these reactants is suitable.

As indicated hereinabove, the organic and inorganic acids of the guanidine-substituted products of the present invention are within the purview of the instant discovery. Typical inorganic salts are those of mineral acids, e.g., HCl, $H_2SO_4$, HBr, and the like; typical organic salts are acetate, phthalate and malate derivatives.

The biguanide para-toluenesulfonate derivatives of the of the invention are prepared by fusing the corresponding cyclohexylamine para-toluenesulfonate with dicyandiamide at a temperature in the range of 140° C. to 180° C.

The amine reactants, and salts thereof, of the present invention encompassed by the general formula, above,

may be prepared by hydrogenating aniline or the corresponding para-alkylaniline or para-alkyl acetanilide. For example, para-n-octylaniline in the presence of a rhodium catalyst is hydrogenated under pressure at a temperature between 50° C. and 60° C. The product 4-n-octylcyclohexylamine results and is recovered from the reaction mixture. This product may be hydrochlorinated with gaseous hydrogen chloride to yield 4-n-octylcyclohexylamine hydrochloride.

Para-n-octylacetanilide may be substituted for para-n-octylaniline in the reaction just described to produce N-acetyl-4-n-octylcyclohexylamine.

Hyrogenation is best accomplished at elevated pressures and at elevated temperatures. Pressures in the range of 40 pounds per square inch gauge, or higher, may be employed. Likewise, temperatures as high as 250° C. and as low as 20° C. are suitable.

The following examples illustrate the preparation of typical alkyl cyclohexylamine reactants, and salts thereof:

EXAMPLE A 4-n-octylcyclohexylamine

Para-n-octylaniline (10.5 grams, 0.051 mole) is suspended in 150 milliliters of water together with 2.5 grams of 5% rhodium on alumina and subjected to a pressure of 60 pounds per square inch of hydrogen at 56° C., with shaking. After 6 hours the theoretical amount of hydrogen is absorbed. The catalyst is filtered and washed with ether. The aqueous layer is extracted with an additional amount of ether. The ether extracts are then dried and the ether evaporated, yielding product 4-n-octylcyclohexylamine, as a viscous oil.

EXAMPLE B 4-n-octylcyclohexylamine hydrochloride

The 4-octylcyclohexylamine product from Example A, above, is dissolved in anhydrous ether. The resulting solution is cooled in an ice-bath and saturated with gaseous hydrogen chloride, whereupon 6.15 grams (54% yield) of 4-octylcyclohexylamine hydrochloride precipitates, the cis and trans isomers are separated by fractional recrystallization from ethyl acetate in which the trans isomer is insoluble.

EXAMPLE C

N-acetyl-4-n-octylcyclohexylamine

Para-n-octylacetanilide (18.0 grams, 0.073 mole) is suspended in 80 milliliters of water together with 5 grams of 5% rhodium on alumina and subjected to a pressure of 60 pounds per square inch of hydrogen at 67° C. with shaking. After completion of the hydrogenation, the reaction mixture is diluted with 1 liter of ether, and the catalyst filtered and washed with an additional amount of ether. The ethereal layer is then separated and dried. Removal of the solvent yields 18.0 grams of product, N-acetyl-4-n-octylcyclohexylamine as a greyish-white powder, melting point 50° C.–112° C. The cis and trans isomers are separated by fractional crystallization first from 50% aqueous ethanol, then from hexane, the trans isomer being less soluble.

EXAMPLE D

Cis-N-ethyl-4-n-octylcyclohexylamine

Lithium aluminum hydride (0.6 gram, 0.016 mole) is suspended in 20 milliliters of anhydrous ether in a 250 milliliter three-neck round-bottom flask fitted with a mercury-sealed Hershberg stirrer, an addition funnel, and a reflux condenser. All the openings in the carefully dried apparatus are protected from atmospheric moisture by drying tubes. Cis-N-acetyl-4-n-octylcyclohexylamine (2.0 grams, 0.008 mole) is dissolved in 40 milliliters of anhydrous ether and added to the flask in a thin stream with vigorous stirring and at such a rate as to cause gentle refluxing of the ether. The addition takes 30 minutes. The reaction mixture is stirred and refluxed for 17 hours. It is then cooled in an ice bath and treated dropwise with 15 milliliters of water and then with 75 milliliters of a 20% aqueous solution of sodium potassium tartrate. The stirring is continued for 20 minutes. The mixture is filtered and the flask and filter washed out with warm ether. The ethereal layer is separated, washed with water and dried.

The oil (1.6 grams) obtained after removal of ether consists of a mixture of the unreduced amide with the desired secondary amine. Separation of the components is achieved by treatment of the mixture with 20 milliliters of 10% hydrochloric acid and extraction of the undissolved neutral material with five 20 milliliter portions of ether. The aqueous layer is separated and made alkaline with 20 milliliters of 15% sodium hydroxide. The free amine is extracted with three 30 milliliter portions of ether. The dried ethereal solution is concentrated, yielding 1.0 gram of pale yellow oil product, N-ethyl-4-n-octylcyclohexylamine.

EXAMPLE E

*Cis-N-ethyl-4-n-octylcyclohexylamine hydrochloride.* — Cis-N-ethyl-4-octylcyclohexylamine (1.0 gram) produced as in Example D, above, is dissolved in 15 milliliters of anhydrous ether. Gaseous hydrogen chloride is passed into this solution, precipitating 0.9 gram of cis-N-ethyl-4-n-octylcyclohexylamine hydrochloride, melting point 194° C.–195° C., after recrystallization from ethyl acetate.

As is evident from Example D, above, the N-ethyl-4-n-alkylcyclohexylamine reactants contemplated herein may be prepared by reacting the corresponding N-acetyl-4-n-alkylcyclohexylamine with lithium aluminum hydride. All of these reactions are more fully described in corresponding U.S. application Serial No. 164,613 referred to hereinabove and incorporated herein by reference.

The novel guanidine and biguanide derivatives of the present invention, and their salts, are prepared from their corresponding amines and substituted amines as illustrated in the following typical examples:

EXAMPLE I

*Cis(4 - n - octylcyclohexyl) guanidine hydrochloride.*— Cis-4-n-octylcyclohexylamine hydrochloride (1.5 grams, 0.006 mole) and 0.45 gram (0.011 mole) of cyanamide, freshly recrystallized, are heated in 20 milliliters of refluxing n-butanol for 7½ hours. Removal of the solvent and trituration of the residue with acetone yields a solid which is identified by its infrared absorption spectrum as the product guanidine hydrochloride, above.

EXAMPLE II

*(4 - tert - octycyclohexyl)guanidine hydrochloride.*—4-tert-octylcyclohexylamine hydrochloride (3.0 grams 0.016 mole) and 0.9 gram (0.022 mole) of cyanamide (freshly recrystallized) is heated in 40 milliliters of refluxing n-butanol for 20 hours; a clear solution is obtained. The solvent is removed in vacuo, and trituration of the residue with acetone as well as washing it with water removes the unreacted amine hydrochloride and dicyandiamide formed during the reaction. Removal of the solvents and trituration with ethyl acetate yields a product of solid, melting point 207–208° C. (from acetone-methanol), which analyzes correctly for the product guanidine salt, above.

EXAMPLE III

*[4-(mixed nonyl)cyclohexyl] guanidine hydrochloride.*—A solution of 7.2 grams (0.027 mole) of (mixed nonyl)cyclohexylamine hydrochloride in 50 milliliters of n-butanol is treated under reflux with 1.8 grams (0.044 mole) of freshly recrystallized cyanamide for 7 hours. The solvent is removed, the residual oil is dissolved in ether, washed with 5% aqueous sodium hydroxide and with saturated sodium chloride solution, dried, and the solvent is removed again. The residual oil is identified by its infrared absorption spectrum as the product guanidine named above.

EXAMPLE IV

*(4 - tert - octylcyclohexyl) biguanide p - toluenesulfonate.*—4-tert-octylcyclohexylamine para-toluene sulfonate (7.72 grams, 0.02 mole) and 1.6 grams (0.02 mole) of dicyandiamide are mixed thoroughly, heated with occasional stirring to 160° C., and kept at that temperature for circa 2 hours. The turbid molten mixture solidifies to a glass-like product when allowed to cool to room temperature. It is fractionally recrystallized from ethyl acetate, then from acetone, yielding 2.7 grams of material analyzing as the biguanide salt monohydrate. Subsequent trituration with warm ethyl acetate, followed by careful drying, afforded the subject biguanide product, melting point 168–169° C.

EXAMPLE V

*4-tert-octylcyclohexylguanidine acetate.*—A solution of 5.8 grams (0.02 mole) of 4-tert-octylcyclohexylguanidine hydrochloride prepared as in Example II, supra, in 300 milliliters of hot water is treated with a solution of 4.92 grams (0.06 mole) of anhydrous sodium acetate in 40 milliliters of warm water. A turbidity, which develops at once, changes slowly on cooling and seeding into a heavy precipitate of 4-tert-octylcyclohexylguanidine acetate.

EXAMPLE VI

*4-tert-octylcyclohexylguanidine L-malate.*—When 5.8 grams (0.02 mole) of 4-tert-octylcyclohexylguanidine hydrochloride, prepared as in Example II, supra, and dissolved in 200 milliliters of hot water, is treated with a solution of 5.36 grams (0.04 mole) of L-malic acid in 100 milliliters of warm water, shiny, plate-like crystals of the corresponding guanidine malate separate slowly on cooling. Upon filtration, 3.2 grams of the product 4-tert-octylcyclohexylguanidine L-malate is collected.

EXAMPLE VII

*4-tert-octylcyclohexylguanidine acid phthalate.*—An ion-exchange resin column (Amberlite IR 400, OH form) of circa 40 milliliters volume is prepared and washed with 100 milliliters of 50% aqueous isopropanol. A solution of 5.8 grams (0.02 mole) of 4-tert-octylcyclohexylguanidine hydrochloride in 100 milliliters of 50% aqueous isopropanol is passed slowly through the column into a flask containing 3.3 grams (0.02 mole) of phthalic acid dissolved in 50 milliliters of the same solvent. Care is taken to protect the intermediate free base from $CO_2$ of the air by plugging the neck of the receiving flask with a wad of glass wool. Removal of the solvent in vacuo yields 4-tert-octylcyclohexylguanidine acid phthalate.

The products of the present invention are useful as protective fungicides. For example, cucumber anthracnose (*Colletotrichum lagenarium*) and tomato late blight (*Phytophthora infestants*) are effectively controlled by means of the products of the present invention. Cucumber leaves and tomato transplants are sprayed to beyond run-off at 500 parts per million and 100 parts per million of the test chemical in a 50/50 solution of acetone and water. After the spray deposits are dried, cucumbers are inoculated with the anthracnose pathogen (*Colletotrichum lagenarium*) and tomatoes inoculated with the late blight pathogen (*Phytophthora infestans*). These inoculated plants are then incubated at 18° C. and 100% relative humidity for 96 hours. They are then placed in the greenhouse to await symptom development. Disease incidence is graded in about 6 days.

The following table teaches the effectiveness of representative compounds of the present invention:

TABLE I

| Compound | p.p.m. | Colletotrichum lagenarium (Cucumber anthracnose) | Phytophthora infestans (Tomato late blight) |
|---|---|---|---|
| (4-tert-octylcyclohexyl) guanidine hydrochloride. | 500 / 100 | *1 / 2 | 2 / 3 |
| [4-(mixed nonyl)cyclohexyl]guanidine hydrochloride. | 500 / 100 | 0 / 1 | -------- / -------- |
| (4-tert-octylcyclohexyl)-biguanide p-toluene-sulfonate. | 500 / 100 | 0 / 0 | 2 / 1 |

*Disease Control Index: 0=No disease; 1=trace; 2=slight; 3=moderate; 4=severe; 5=same as checks.

As is evident from the representative and typical examples in Table I, above, the compounds of the present invention are very effective antifungal agents.

Clearly, the instant discovery encompasses numerous modifications within the skill of the art. Consequently, while the present invention has been described in detail with respect to specific embodiments thereof, it is not intended that these details be construed as limitations upon the scope of the invention except insofar as they appear in the appended claims.

We claim:
1. A cyclohexyl compound having the formula:

wherein $R^1$ is a substituent selected from the class consisting of hydrogen and ethyl; $R^2$ is a substituent selected from the class consisting of,

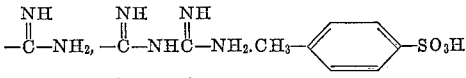

and the acid addition salt of

and $R^3$ is a higher alkyl substituent having from 8 to 16 carbon atoms.

2. (4-tert-octylcyclohexyl)guanidine hydrochloride.
3. (4-tert-octylcyclohexyl)biguanide - p - toluene-sulfonate.
4. 4-tert-octylcyclohexylguanidine acetate.
5. 4-tert-octylcyclohexylguanidine L-malate.
6. 4-tert-octylcyclohexylguanidine acid phthalate.

References Cited by the Examiner
UNITED STATES PATENTS
2,473,112    6/1949    Short et al. _____ 260—501

FOREIGN PATENTS
593,675    10/1947    Great Britain.

CHARLES B. PARKER, *Primary Examiner.*
FLOYD D. HIGEL, *Assistant Examiner.*